Patented Apr. 26, 1938

2,115,192

UNITED STATES PATENT OFFICE 2,115,192

ARYLOXY POLYALKYLENE ETHER SULPHONATES

Herman A. Bruson, Philadelphia, Pa., assignor to Röhm & Haas Company, Philadelphia, Pa.

No Drawing. Application June 20, 1936, Serial No. 86,344

18 Claims. (Cl. 260—150)

This invention relates to aryloxy polyalkylene ether sulphonates having the general formula $$R-O-A-(O-A)_n-O-A-SO_3M$$

in which R is an aromatic hydrocarbon radical, A represents alkylene groups having at least two carbon atoms, $n$ is zero or one, and M is a metal.

It relates more particularly to the water-soluble salts of the above type which I have found, have a marked capillary activity and are useful as textile assistants and as dispersing, emulsifying, wetting, cleansing, introfying, and spreading agents.

The salts of this type are prepared by heating a metal sulphite with an aryloxy polyalkylene ether chloride having the general formula $$R-O-A-(O-A)_n-O-A-X$$

in which X is a halogen atom. The product resulting from the condensation of the metal sulphite and the aryloxy polyalkylene ether halide is the salt of the corresponding sulphonic acid having the general formula $$(R-O-A-(O-A)_n-O-A-SO_3)_xM$$

in which R, A and $n$ have the above stated meanings, M is a metal and $x$ is its valence.

The aryloxy polyalkylene ether halides used in this process may be prepared by condensing a phenol with a dihalogeno polyalkylene ether of the type $$X-A-O-(A-O)_n-A-X$$

in the presence of a strongly alkaline condensing agent under such conditions that only one of the halogen atoms is substituted by the aryloxy group. A process for preparing these halides is described in my copending application Serial No. 79,718, filed May 14, 1936.

For the purposes of the present invention the aromatic radical R of the aryloxy polyalkylene ether halide is derived from a phenol, or a naphthol such as phenol, o-, m-, or p-cresol, any of the isomeric xylenols, thymol, carvacrol, but preferably alkyl- or polyalkyl-substituted phenols such as any of the straight or branched chain butyl, amyl, hexyl, heptyl, octyl, nonyl, decyl, dodecyl, hexadecyl or octadecyl phenols or cresols; or the phenyl, cyclohexyl, and benzyl phenols; naphthol, and similarly substituted naphthols.

In the dihalogeno polyalkylene ethers used for condensing with the above phenols, the alkylene groups have preferably two, three or four carbon atoms which may be arranged in a straight chain or branched chain when the group has three or four carbon atoms. Among these dihalogeno polyalkylene ethers are β, β'-dichlorodiethyl ether, γ, γ'-dichlorodipropyl ether, β, β'-dichlorodiisopropyl ether, β-chloroethoxyethyl-β'-chloroethyl ether, $ClCH_2-CH_2-O-CH_2-CH_2-O-CH_2-CH_2Cl$, β, β'-dichlorodiisobutyl ether and their higher homologs. The corresponding dibromo and diiodo compounds may also be used, and with them the reaction can generally be carried out at a lower temperature.

The condensation between the metal sulphite and the aryloxy polyalkylene ether halide may be carried out in aqueous or aqueous-alcoholic solution. If the halide used is the chloride, the reaction is carried out preferably at a temperature above 125° C. (150–190° C. is a good working range) at superatmospheric pressure, whereas if it be a bromide or iodide, the reaction may be conducted under a reflux condenser at ordinary pressure. Among the more readily available metal sulphites which can be used are the neutral sulphites of sodium and potassium. Other metal sulphites such as those of calcium, magnesium, zinc and copper can be used, but the water-soluble alkali metal sulphites are the most efficient and therefore sodium sulphite or potassium sulphite is preferred. The use of bisulphites or of ammonium sulphite leads respectively to break down products of the aryloxy polyalkylene ethers employed or to impure reaction products.

In order to illustrate more fully this invention, the following examples are given.

Example 1

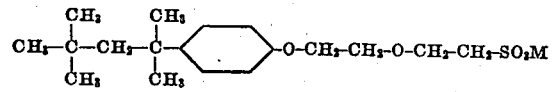

In an enameled iron autoclave fitted with an agitator there was placed 100 g. of p-ter-octyl-phenoxyethoxyethyl chloride together with 400 cc. of water and 46 g. of sodium sulphite

($Na_2SO_3$)

The mixture was stirred and heated at 150–160° C. for seven hours. The pressure developed was about 90 lbs. per square inch.

At the end of this time, the product was completely soluble in water. It had the consistency of soft soap and gave a very foamy, soapy, lathery solution. When dried in vacuo, it formed a white wax-like mass. It showed excellent wetting-out properties on cotton yarn. At a concentration of 3 g. per liter it showed a wetting-out time of about 9 seconds when tested by the official Draves method of evaluating wetting agents on a 5 g. skein of unboiled two-ply cotton yarn at 25° C.

The product can be purified if desired by dissolving in alcohol, which leaves undissolved any sodium chloride or sodium sulphite that may be present, and evaporating the alcohol.

By using a molecularly equivalent quantity of potassium sulphite in place of the sodium sulphite, the corresponding potassium sulphonate is obtained. This has the same general properties as the sodium salt.

The sodium p-ter-octylphenoxyethoxyethyl sulphonate, in addition to having a high wetting-out action, is useful as an emulsifying and spreading agent for oil-soluble contact insecticides, such as organic thiocyanates. It may also be used as a leveling agent in dyeing.

*Example 2*

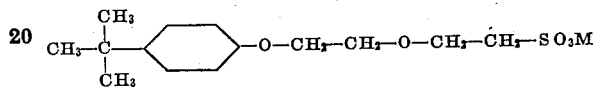

A mixture of 128 g. of p-ter-butylphenoxyethoxyethyl chloride, 66 g. of sodium sulphite and 400 cc. of water was heated in an iron autoclave while stirring rapidly for 4 hours at 155–160° C. The pressure rose to about 90 lbs. per square inch.

The product was dried and extracted with boiling alcohol. Upon cooling, the sodium p-ter-butylphenoxyethoxyethyl sulphonate crystallized in colorless plates. It is very soluble in water. The aqueous solution is very foamy and soap-like, gives no precipitate with soluble calcium or magnesium salts or hard water, and can be used as a spreading agent for contact insecticides.

The potassium salt is a water-soluble crystalline material and is prepared in the same manner.

*Example 3*

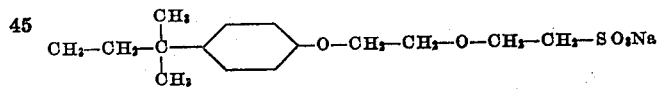

A mixture of 135 g. of p-ter-amylphenoxyethoxyethyl chloride, 66 g. of sodium sulphite and 375 cc. of water was heated eight hours at 155–160° C. at 90–93 lbs. per square inch pressure while stirring constantly in an enameled steel autoclave.

A water-soluble, creamy mass was obtained, which foams readily in solution and is well adapted for use as a wetting-out agent or as an assistant in dyeing or bleaching operations. It can be concentrated to a waxy solid.

*Example 4*

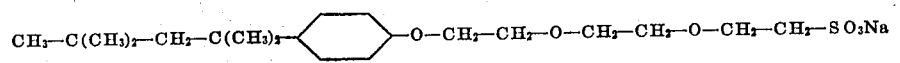

A mixture of 126 g. of p-ter-octylphenoxyethoxyethylchloroethyl ether, 43.8 g. of $Na_2SO_3$ (96% pure) and 400 cc. of water was heated in an iron autoclave at 155° C. for six hours while stirring rapidly.

A water-soluble soap-like mass was obtained having good detergent and wetting-out properties.

*Example 5*

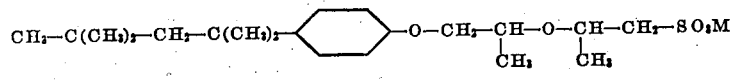

A mixture of 34 g. of p-($\alpha,\alpha,\gamma,\gamma$-tetramethylbutyl) phenoxy-isopropoxy-isopropyl chloride was heated at 170° C. for six hours in a steel autoclave with 13 g. of sodium sulphite and 150 cc. of water, under constant agitation.

The white, soap-like mass obtained is useful as a detergent and emulsifying agent.

The potassium salt is also a soapy solid and is readily obtained by using 17 g. of potassium sulphite in place of the sodium sulphite above.

*Example 6*

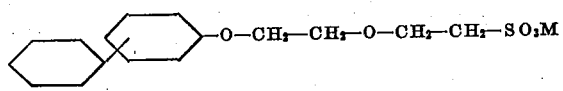

One mol. equivalent of either o- or p-phenylphenoxyethoxyethyl chloride when heated with one mol. equivalent of sodium sulphite or potassium sulphite and water at 150–160° C. under pressure as described in the previous examples yields a water-soluble sulphonate of the above formula useful as a wetting-out agent.

*Example 7*

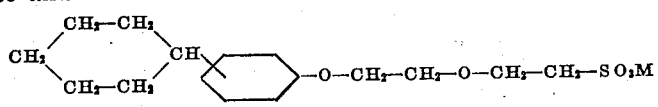

One mol. equivalent of either o- or p-cyclohexylphenoxyethoxyethyl chloride when heated with one mol. equivalent of sodium sulphite or potassium sulphite at 150–160° C. for six to eight hours with water in an autoclave as described in the previous examples yields a water-soluble, soapy sulphonate having capillary active properties.

*Example 8*

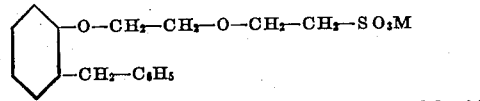

29 g. of o-benzylphenoxyethoxyethyl chloride and 12.7 g. of sodium sulphite in 100 cc. of water was heated at 160–165° C. for four hours in an iron autoclave. The water-soluble sodium sulphonate has capillary active properties.

In the same manner, the p-benzylphenoxyethoxyethyl chloride yields the corresponding sodium sulphonate.

*Example 9*

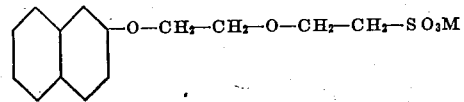

One mol. equivalent of $\beta$-naphthoxyethoxyethyl chloride, 1.05 mols of sodium sulphite and 400 cc. of water were heated together while stirring at 160° C. in an enameled iron autoclave for five hours. The solution of the water-soluble sodium sulphonate obtained was evaporated to dryness and extracted with alcohol to free it from sodium chloride. Upon removal of the alcohol, the pure compound was obtained. It can be used as a wetting-out agent. The corresponding potassium sulphonate is likewise a capillary active compound.

Example 10

One mol. equivalent each of sodium sulphite and p-ter-butylphenoxyethoxyethyl bromide was boiled under reflux in a mixture of equal volumes of water and alcohol in the presence of 1% of copper powder for 22 hours. The product obtained was a water-soluble sulphonate identical with that described in Example 2.

Example 11

$$CH_3-\underset{\underset{CH_3}{|}}{\overset{\overset{CH_3}{|}}{C}}-CH_2-\underset{\underset{CH_3}{|}}{\overset{\overset{CH_3}{|}}{C}}-\underset{}{\underset{}{\bigcirc}}-\overset{CH_3}{\underset{}{}}-O-CH_2-CH_2-O-CH_2-CH_2-O-CH_2-CH_2-SO_3Na$$

A mixture of 123.5 g. of α,α,γ,γ-tetramethylbutylcresyloxyethoxyethyl-β'-chloroethyl ether, 43.8 g. of Na₂SO₃ and 400 cc. of water was heated for eight hours in a steel autoclave while constantly agitating at 150–160° C. Pressure 90–100 lbs./sq. in. The white, soap-like mass obtained is a good detergent and emulsifying agent.

The tetramethylbutylcresyloxyethoxyethyl-β'-chloroethyl ether used above was obtained by condensing β-chloroethoxyethyl - β' - chloroethyl ether with α,α,γ,γ-tetramethylbutyl-o-cresol in the presence of caustic soda.

Example 12

$$CH_3-(CH_2)_5-\underset{\underset{}{}}{\overset{\overset{CH_3}{|}}{CH}}-\bigcirc-O-CH_2-CH_2-O-CH_2-CH_2-SO_3M$$

A mixture of 226.7 g. of p-sec-octylphenoxyethoxyethyl chloride, 92 g. of Na₂SO₃ and 800 cc. of water was heated while stirring in a steel autoclave at 180–190° C. for four and one-half hours. Pressure rose to 200 lbs./sq. in. The product was a viscous water-soluble jelly having marked detergent properties.

The p-sec-octylphenoxyethoxyethyl chloride was obtained by condensing p-sec-octylphenol with excess β,β'-dichlorodiethyl ether in the presence of caustic soda.

Example 13

$$C_{12}H_{25}-\bigcirc-O-CH_2-CH_2-O-CH_2-CH_2-SO_3M$$

A mixture of 1 molecular equivalent of p-ter-dodecylphenoxyethoxyethyl chloride (obtained by condensing tri-isobutylene with phenol and sulphuric acid and subsequently heating the product with excess β,β'-dichlorodiethyl ether and caustic soda), 1 mol. of anhydrous sodium sulphite and an equal volume of water was heated at 175–180° C. with stirring in an autoclave for five hours. The product was a water-soluble soap.

In place of the above compounds the corresponding straight chain alkyl phenols, cresols, xylenols or naphthols can be used.

Example 14

$$C_{16}H_{33}-\bigcirc-O-CH_2-CH_2-O-CH_2-CH_2-SO_3M$$

1 mol. of n-hexadecylphenoxyethoxyethyl chloride is heated with 1 mol. equivalent of potassium sulphite in 1 liter of water at 180–190° C. with stirring in an iron autoclave at 200 lbs. pressure per square inch. After six and one-half hours heating a water-soluble, soap-like gel is obtained.

The above compounds are all very stable to hard water, dilute acids and alkalies. They possess the advantage over the already known straight chain aliphatic sulphonates or sulphates in having a higher degree of solubility in cold water. Being phenolic ethers they are relatively inexpensive and are readily synthesized in good yield and quality. The presence of an aromatic ring and a plurality of short chain ether linkages gives them a high degree of wetting-out power without sacrificing their washing properties in those members having detergent activity.

I claim:

1. The compound having the formula $$CH_3-\underset{\underset{CH_3}{|}}{\overset{\overset{CH_3}{|}}{C}}-CH_2-\underset{\underset{CH_3}{|}}{\overset{\overset{CH_3}{|}}{C}}-\bigcirc-O-CH_2-CH_2-O-CH_2-CH_2-SO_3Na$$

2. The compound having the formula $$CH_3-\underset{\underset{CH_3}{|}}{\overset{\overset{CH_3}{|}}{C}}-CH_2-\underset{\underset{CH_3}{|}}{\overset{\overset{CH_3}{|}}{C}}-\underset{}{\overset{\overset{CH_3}{|}}{\bigcirc}}-O-CH_2-CH_2-O-CH_2-CH_2-SO_3Na$$

3. The compound having the formula $$CH_3-\underset{\underset{CH_3}{|}}{\overset{\overset{CH_3}{|}}{C}}-CH_2-\underset{\underset{CH_3}{|}}{\overset{\overset{CH_3}{|}}{C}}-\bigcirc-O-CH_2-CH_2-O-CH_2-CH_2-O-CH_2-CH_2-SO_3Na$$

4. A compound of the general formula $$Z-\bigcirc-O-CH_2-CH_2-O-CH_2-CH_2-SO_3M$$

in which Z is a tertiary alkyl group having from 4 to 12 carbon atoms inclusive and M is an alkali metal.

5. A compound having the formula $$\underset{Z}{\bigcirc}-O-CH_2-CH_2-O-CH_2-CH_2-SO_3M$$

in which Z is an alkyl, cycloalkyl, aralkyl, or aryl group and M is an alkali metal.

6. A compound having the formula $$R-O-CH_2-CH_2-O-CH_2-CH_2-SO_3M$$

in which R is a hydrocarbon radical containing an aryl group nuclearly attached to the oxygen atom and M is an alkali metal.

7. Compounds of the general formula $$R-(O-A)_n-O-A-SO_3M$$

in which R is an aryl group containing as a nuclear substituent an alkyl radical having from four to eighteen carbon atoms inclusive, A represents alkylene groups containing from two to four carbon atoms inclusive, $n$ is one of the integers one and two, and M is an alkali metal.

8. Compounds of the general formula $$R—(O—A)_n—O—A—SO_3M$$

in which R is an aromatic hydrocarbon radical, A represents alkylene groups having at least two carbon atoms, $n$ is one of the integers one and two, and M is an alkali metal.

9. Compounds of the general formula $$(R—(O—A)_n—O—A—SO_3)_xM$$

in which R is a phenyl group containing as a nuclear substituent an alkyl radical having from four to eighteen carbon atoms inclusive, A represents alkylene groups containing from two to four carbon atoms inclusive, $n$ is one of the integers one and two, M is a metal of the group consisting of the alkali and alkaline earth metals and $x$ its valence.

10. Compounds of the general formula $$(R—(O—A)_n—O—A—SO_3)_xM$$

in which R is an aryl group containing as a nuclear substituent an alkyl radical having from four to eighteen carbon atoms inclusive, A represents alkylene groups containing from two to four carbon atoms inclusive, $n$ is one of the integers one and two, M is a metal of the group consisting of the alkali and alkaline earth metals and $x$ its valence.

11. Compounds of the general formula $$(R—(O—A)_n—O—A—SO_3)_xM$$

in which R is an aryl group containing as a nuclear substituent a member of the group consisting of alkyl, cycloalkyl, aralkyl and aryl radicals, A represents alkylene groups containing from two to four carbon atoms inclusive, $n$ is one of the integers one and two, M is a metal of the group consisting of the alkali and alkaline earth metals and $x$ its valence.

12. Compounds of the general formula $$(R—(O—A)_n—O—A—SO_3)_xM$$

in which R is an aromatic hydrocarbon radical, A represents alkylene groups having at least two carbon atoms, $n$ is one of the integers one and two, M is a metal of the group consisting of the alkali and alkaline earth metals and $x$ its valence.

13. The process for preparing aryloxy polyalkylene ether sulphonates which comprises heating a metal sulphite of the group consisting of alkali and alkaline earth metal sulphites with an aryloxy polyalkylene ether halide of the general formula $$R—(O—A)_n—O—A—X$$

in which R is an aromatic hydrocarbon radical nuclearly attached to the oxygen atom, A represents alkylene groups containing at least two carbon atoms, $n$ is one of the integers one and two and X is a halogen atom.

14. The process for preparing aryloxy polyalkylene ether sulphonates which comprises heating a metal sulphite of the group consisting of alkali metal and alkaline earth metal sulphites with an aryloxy polyalkylene ether halide of the general formula $$R—(O—A)_n—O—A—X$$

in which R is an aromatic hydrocarbon radical nuclearly attached to the oxygen atom, A represents alkylene groups containing at least two carbon atoms, $n$ is one of the integers one and two, and X is a halogen atom.

15. The process for preparing aryloxy polyalkylene ether sulphonates which comprises heating at temperatures above 125° C. an alkali metal sulphite and an aryloxy polyalkylene ether chloride of the general formula $$R—(O—A)_n—O—A—Cl$$

in which R is an aromatic hydrocarbon radical nuclearly attached to the oxygen atom, A represents alkylene groups containing at least two carbon atoms, and $n$ is one of the integers one and two.

16. The process for preparing aryloxy polyalkylene ether sulphonates which comprises heating at temperatures above 125° C. and at superatmospheric pressure an alkali metal sulphite and an aryloxy polyalkylene ether chloride of the general formula $$R—(O—A)_n—O—A—Cl$$

in which R is an aromatic hydrocarbon radical nuclearly attached to the oxygen atom, A represents alkylene groups containing at least two carbon atoms, and $n$ is one of the integers one and two.

17. The process for preparing aryloxy polyalkylene ether sulphonates which comprises heating at temperatures above 125° C. and at superatmospheric pressure an aqueous solution of an alkali metal sulphite and an aryloxy polyalkylene ether halide of the general formula $$R—(O—A)_n—O—A—Cl$$

in which R is an aromatic hydrocarbon radical nuclearly attached to the oxygen atom, A represents alkylene groups containing at least two carbon atoms, and $n$ is one of the integers one and two.

18. The process of preparing alkylated aryloxy polyalkylene ether sulphonates which comprises heating a mixture of an alkali metal sulphite with an equivalent amount of an alkylated aryloxy polyalkylene ether chloride in an aqueous medium at superatmospheric pressure.

HERMAN A. BRUSON.